United States Patent
Nenicka

[11] Patent Number: 6,080,374
[45] Date of Patent: Jun. 27, 2000

[54] CENTRIFUGAL CRYSTALLIZATION REFINING APPARATUS

[76] Inventor: Vratislav Nenicka, 2362 Haymaker Rd., Monroeville, Pa. 15146

[21] Appl. No.: 09/211,523

[22] Filed: Dec. 14, 1998

Related U.S. Application Data

[63] Continuation-in-part of application No. 08/844,838, Apr. 22, 1997, abandoned.

[51] Int. Cl.$^7$ ....................................................... B01D 7/02
[52] U.S. Cl. ................... 422/251; 422/245.1; 422/250.1; 422/253; 422/254; 422/258
[58] Field of Search .............................. 422/245.1, 250.1, 422/251, 253, 254, 258

[56] References Cited

U.S. PATENT DOCUMENTS

| | | | |
|---|---|---|---|
| 3,844,725 | 10/1974 | Nenicka | 23/300 |
| 5,131,989 | 7/1992 | Dotson et al | 205/474 |

*Primary Examiner*—Felisa Garrett
*Attorney, Agent, or Firm*—Klaus J. Bach

[57] ABSTRACT

An apparatus for performing centrifugal crystallization of organics, which unifies all the individual steps for the removal of impurities into a single operation. The apparatus consists of two coaxial rotors and stationary parts. A crystallizable feed stock is mixed under pressure with a suitable refrigerating solvent and injected into a rotating liquid ring of the process materials. A faster drum-shaped outer rotor rotates the process materials while a slower frame-shaped inner rotor distributes the combined feed, collects refined product and recycles crystal fines as seeds. Advantage is taken of the centrifugal force and of the radial pressure gradient for gradual adiabatic evaporation of the solvent and simultaneous crystallization of the substance to be purified, as well as for the separation of phases, counter-current crystal washing with its own melt, followed by product melting by external heat, and withdrawal of a product from the apparatus. The refrigerant solvent vapor is recycled after liquefaction.

12 Claims, 5 Drawing Sheets

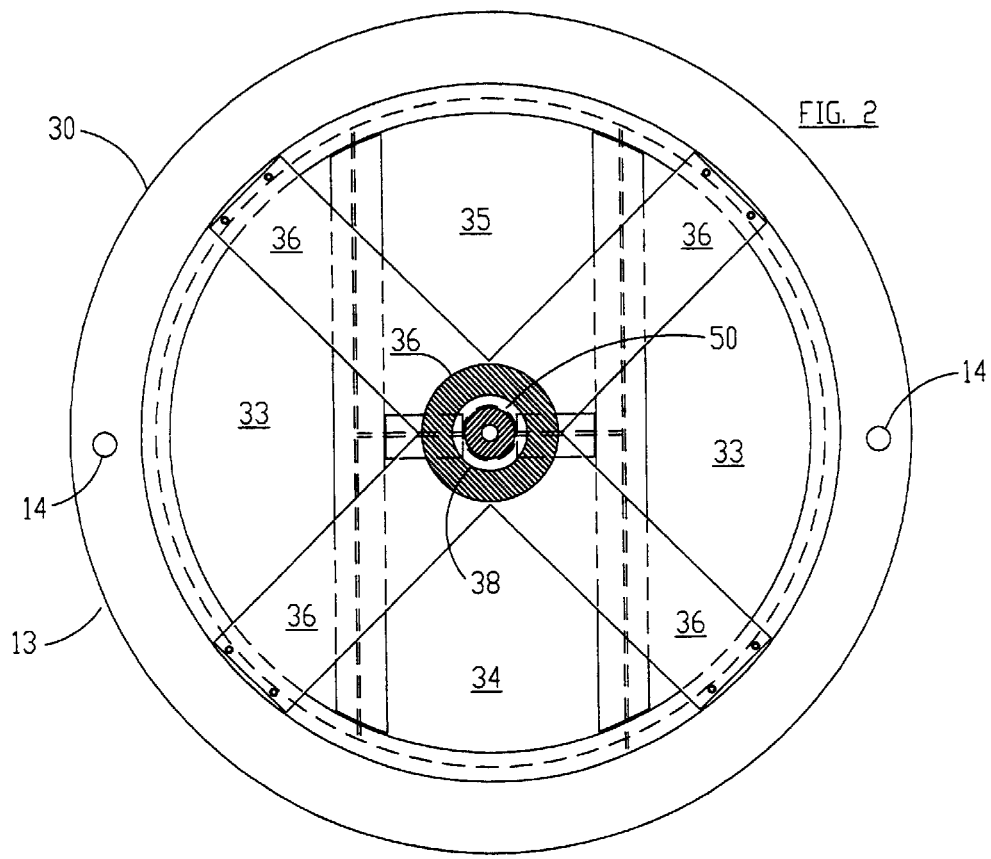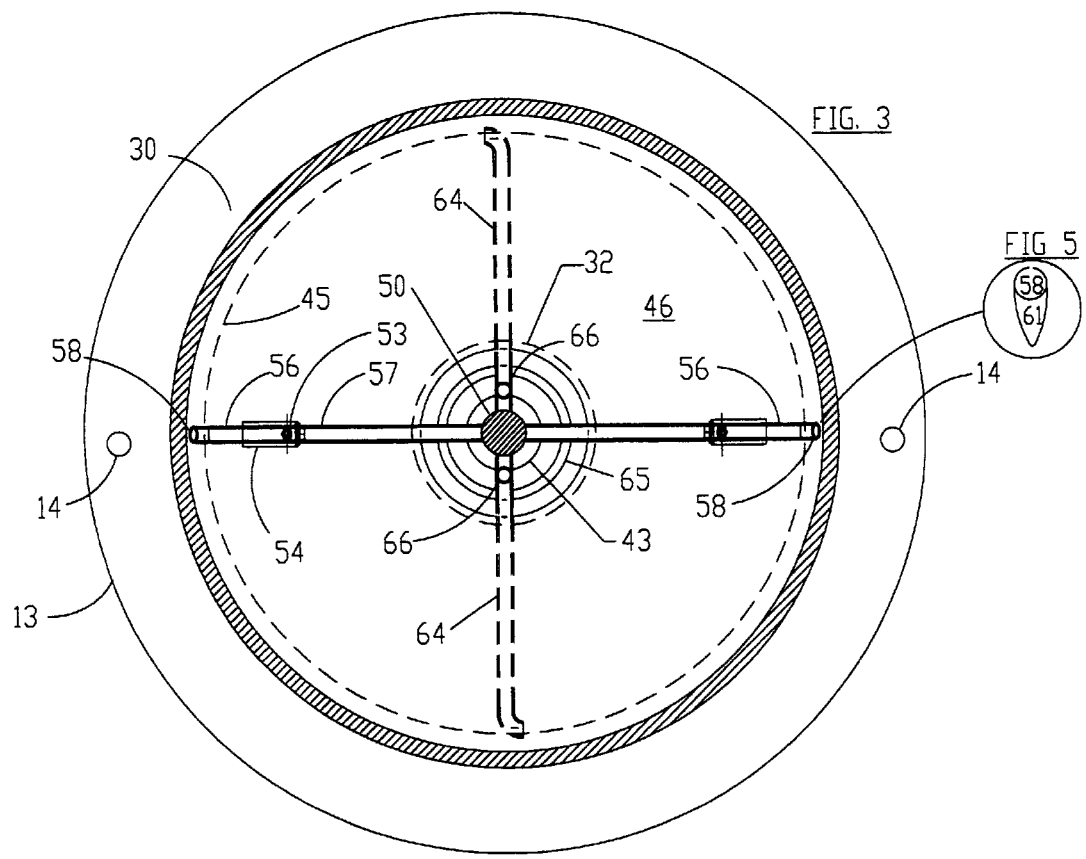

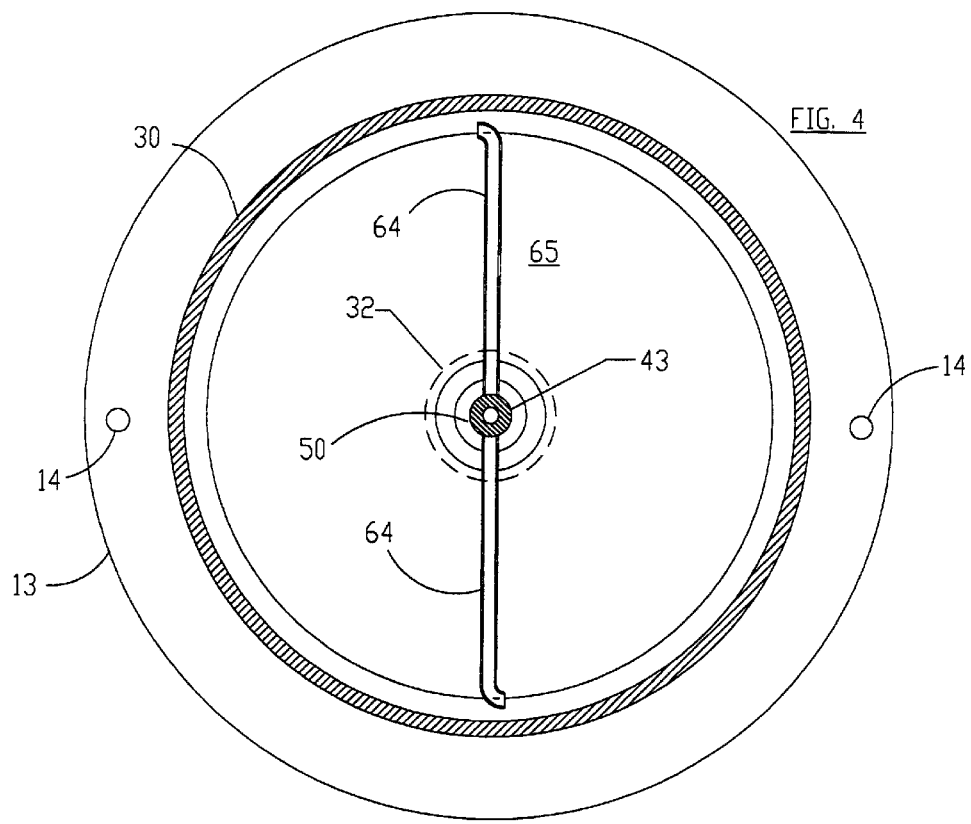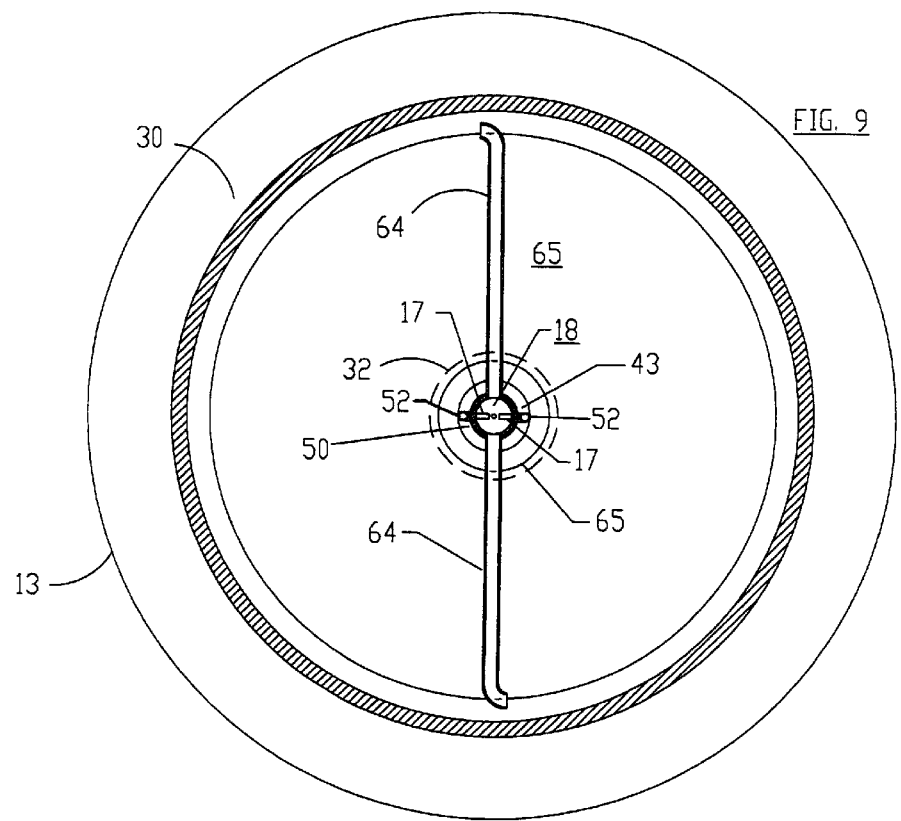

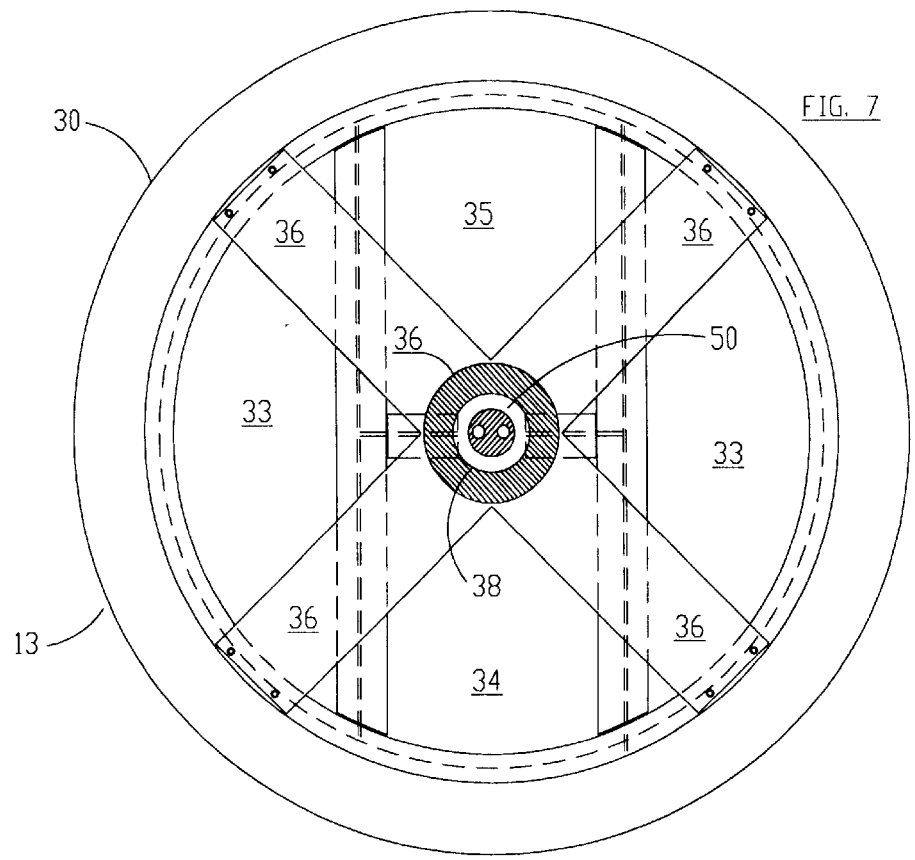
FIG. 7
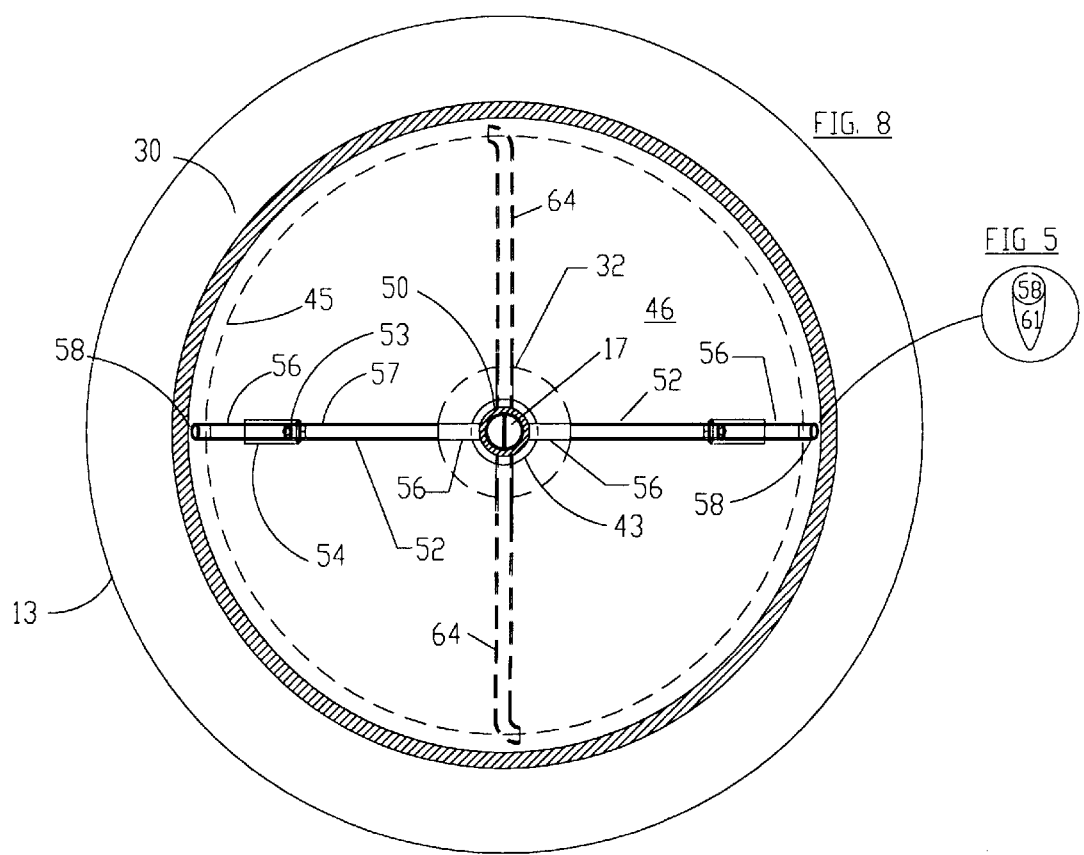
FIG. 8
FIG. 5

CENTRIFUGAL CRYSTALLIZATION REFINING APPARATUS

This is a continuation-in-part application of application Ser. No. 08/844,838 filed under the same title on Apr. 22, 1997 now abandoned.

BACKGROUND OF THE INVENTION

1. Field of the Invention

The invention relates to the purification of crystallizable chemicals.

2. Description of the Prior Art

A process of centrifugal crystallization is disclosed in U.S. Pat. No. 3,844,725.

Existing crystallization systems work with a number of steps such as:

crystallization by solvent evaporation and/or cooling, separation of obtained crystals from mother liquor, removal of impurities occluded on the crystal surface by washing with solvent (or product melt in some cases), separation of the crystals from the wash, removal of the remnants of the solvent from the washed product by drying, melting the crystals (in some cases).

Most of the enumerated steps are carried out separately, a few systems combine two or more steps; none is capable of executing the entire procedure in a single operation and in a single apparatus.

In the crystallization of organics, the most effective method for removing impurities from the crystal surface appears to be the counter-current washing with their own melt. Most of the present systems work with a tightly packed bed of crystals where proper washing is hindered by the presence of contact points and contact facets. Some others achieve the counter-current washing in a number of reslurrying and separating stages, or in a vertical column employing internal screw-type conveying means.

Most of the required equipment is heavy and cumbersome, demanding on manpower, maintenance, energies, instrumentation etc.; operational difficulties are encountered with handling crystal slurries and freezups. All these facts are so discouraging that in the selection of a purification process in many a case distillation is chosen as a resort for some crystallizable compounds, in spite of its high energy demand and, in some cases, in spite of the necessity of first chemically converting impurities with close boiling points.

SUMMARY OF THE INVENTION

The subject of this invention is an apparatus consisting of stationary parts and two coaxial rotors, an outer one serving for rotating process materials, and a slower inner rotor which distributes the feed liquid around the perimeter and collects the purified product. The stationary parts serve for mechanical support, feed introduction, product and reject takeoff, heat delivery and drives for rotating both rotors.

A selected refrigerating solvent (RS) is added under pressure to a crystallizable feed and this liquid combined feed (CF) is distributed within a rotating annular liquid ring in the apparatus. External control makes the liquid proceed toward a cylindrical liquid surface, in the direction of decreasing hydrostatic pressure. As a result, an adiabatic process takes place which gradually boils off the RS while forming crystals. The crystals move in the outward direction, toward the heated cylindrical wall of the external rotor; along this path, they get in counter-current contact first with the process fluid and then with the reflux portion of the product melt. This contact removes liquid impurities occluded on the crystal surface.

Eventually, washed crystals melt in the vicinity of the heated wall and are withdrawn from the apparatus as a refined liquid product. The reject stream (mother liquor deprived of all solids) leaves the opposite end of the apparatus, together with the RS vapor. All the transportation of materials within the process is made possible by the rotational forces and the speed difference of the two rotors. The refrigerating solvent vapor is recycled after liquefaction.

BRIEF DESCRIPTION OF THE DRAWINGS

FIG. 2 is a horizontal cross-sectional view of the apparatus taken along line 2—2 of FIG. 1; the centering hub 36 is shown rotated by 45 degrees.

FIG. 3 is a horizontal cross-sectional view of the apparatus taken along line 3—3 of FIG. 1.

FIG. 4 is a horizontal cross-sectional view of the apparatus taken along line 4—4 of FIG. 1.

FIG. 5 is a detail of a typical cross-section of items 53, 58 and 61.

FIG. 7 is a horizontal cross-sectional view of the apparatus taken along line 7—7 of FIG. 6.

FIG. 8 is a horizontal cross-sectional view of the apparatus taken along line 8—8 of FIG. 6.

FIG. 9 is a horizontal cross-sectional view of the apparatus taken along line 9—9 of FIG. 6.

DESCRIPTION OF A PREFERRED EMBODIMENT OF THE APPARATUS

Figure 1:
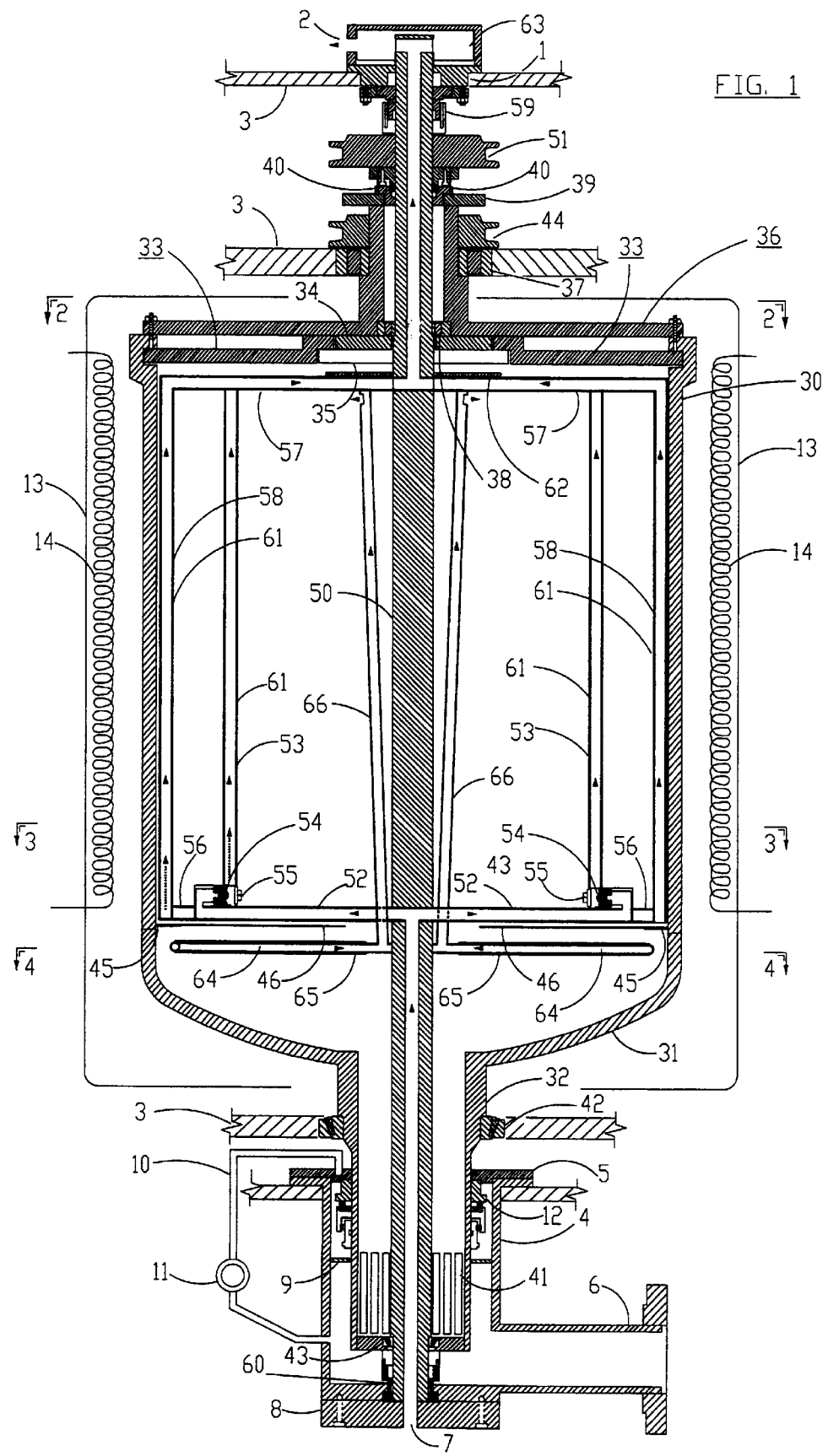
FIG. 1 is a vertical cross-sectional view of the basic embodiment of the apparatus according to the invention; for clarity's sake, the crystal seed recirculating impeller 64 and crystal seed conduits 66 are shown rotated 80 degrees clockwise.
Figure 6:
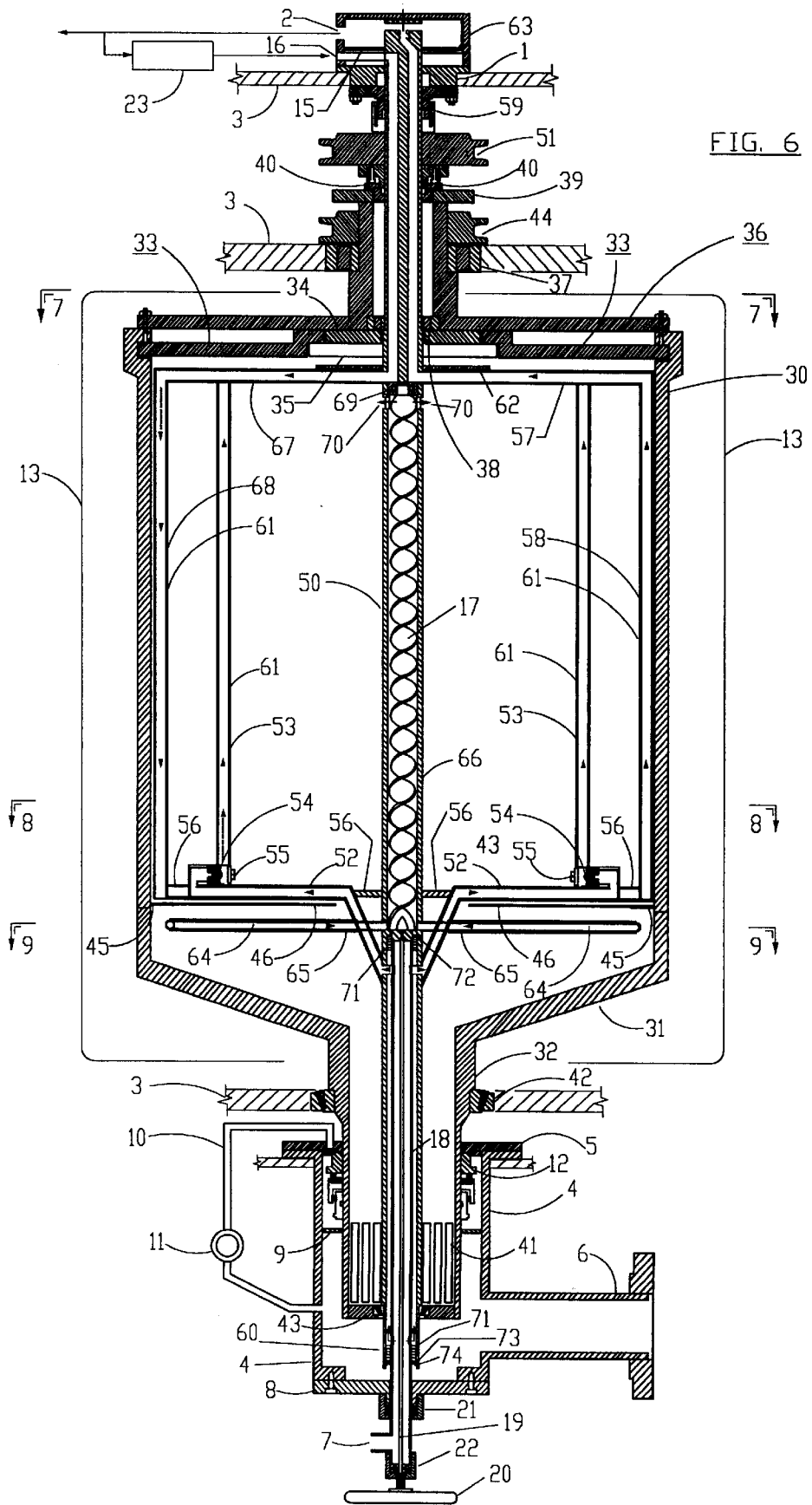
FIG. 6 is a vertical cross-sectional view of an advanced embodiment showing optional and alternate features of the apparatus; for clarity's sake, the crystal seed recirculating impeller 64 is shown rotated 80 degrees clockwise.

The apparatus according to the invention consists of two coaxial rotors (inner and outer, disposed within one another) and of a stationary structure on which the rotors are supported and which includes inlet and outlet structures for the process fluids.

The outer rotor is a drum-shaped body having an inner rotor concentrically disposed therein, having a cylindrical portion 30 with a dished (or conical) bottom 31 integral with the cylindrical portion 30. It has a removable top consisting of formed segments (parts 33, 34, 35 and 36) to provide access to the body 30 for assembling and disassembling the apparatus. This rotor is supported on a frame 3 by bearings 42 and 37.

The inner rotor has a shape of a double-frame with a shaft 50 extending in the center and including a feed distributing system, a product collecting system and a crystal seed recirculating system. The feed distributing system consists of a pair of feed conduits 52 connected to the lower portion of the shaft 50 and forming a passageway from the shaft 50 into a pair of feed distributors 53 through a pair of back pressure valves 54.

The product collecting system consists of a pair of product conduits 57 connected to the upper part of the shaft 50 and providing a passageway from a pair of product collectors 58 through a passage in the upper part of the shaft 50 to a standard-type centrifugal impeller 63.

The crystal seed recirculating system consists of a two-armed impeller 64 sandwiched within an underflow double-disc 65 and of one pair of seed recirculating conduits 66.

The stationary support structure comprises a frame 3 and two end pieces serving as inlet and outlets for fluids, further two motors (not shown) and heating elements 14 with a shroud 13 surrounding the cylindrical portion 30 of the outer rotor.

OPERATION OF THE APPARATUS

The two rotors are rotated by the motors at different speeds, the outer one being faster; the speed of rotation depends on the diameter of the drum and on the compounds processed. As an example, for refining some compounds with butane as refrigerant in a 20" (50 cm) drum the calculated speed of the faster rotor is 1750 rpm. A difference of at least 60 rpm is considered to be appropriate for the slower rotor.

The combined feed (CF) consisting of liquid crude (LC) and a selected refrigerating solvent (RS) is pumped through a stationary entrance port 7 into the lower portion of the slower rotor assembly. It proceeds through the lower hollow section of the shaft 50, the two feed conduits 52 and the two back-pressure valves (or restriction orifices) 54, and is finally injected into a rotating liquid ring through a narrow slot or a row of holes drilled along each of the two feed distributors 53, in the direction tangential to their orbit.

Under the conditions of rotation, an essentially cylindrical liquid surface is established which is an upward extension of the inner wall of a discharge nozzle 32 attached centrally to the drum bottom 31. This nozzle acts as a liquid overflow for the reject liquid and RS vapor.

The process of adiabatic evaporation and crystallization takes place in the annular space between the feed radius area (imaginary cylindrical plane circumscribed by the feed distributors 53) and the cylindrical liquid surface.

Due to the centrifugal force, there is a steep pressure gradient in the radial direction. In the feed radius area the hydraulic pressure is somewhat higher than the flashing pressure of the liquid at the local temperature. External controls make the liquid proceed radially toward the cylindrical liquid surface, in the direction of the decreasing hydraulic pressure. During this course, the liquid loses its thermodynamic stability and an adiabatic process causes gradual decomposition into three phases simultaneously:

The volatile solvent boils and crystals are formed due to the supersaturation caused both by the resulting drop in temperature and loss of the liquid solvent. As a result, the vapor bubbles rush toward the liquid surface, expanding and eventually disengaging from the liquid. The crystals have a higher specific mass than the surrounding fluids and as they grow, they overcome the drag force created by the centripetal flow and start moving in the opposite, radially outward (centrifugal) direction; they undergo further growth during their passage through the supersaturated environment.

Under the relatively stormy conditions in the crystallization zone between the feed radius area and the cylindrical surface, most of the fines are entrained toward the liquid surface where they act as crystal seeds; this action is very desirable since in this area the liquid is depleted of most of the crystallizable compound and the spontaneous nucleation rate can be expected very low. As the fines grow, some of them gradually overcome the drag and join the main radial outward movement of the crystals. The remaining fines are entrained from the crystallization zone by the mother liquor over the annular overflow disc 46 to the peripheral wall where they get concentrated and captured by a crystal seed recirculating impeller 64 and transferred together with a circulating portion of the mother liquor through the seed recirculating conduits 66 into the upper portion of the cylindrical liquid surface where they get another chance at growing. This recirculation is made possible by the speed differential of the two rotors and is enhanced by a backward curvation of the two arms 64 of the impeller and by radial ribs on the underside of the (faster) overflow disc 46. The remaining portion of the mother liquor (final reject) deprived of all the solids flows around the underflow double-disc 65 and out of the apparatus in concurrent flow with the RS vapor through the overflow nozzle 32, reject and gas discharge slots 41 and discharge nozzle 6. In most cases it must be stripped of the remaining dissolved RS. The RS vapor separates from the mother liquor and is recycled to the process after liquefaction. The recycle of fines facilitates far-reaching depletion of the crystallizable substance from the reject stream while it provides unlimited time and opportunity for the fines to grow and join the product stream.

After passing through the imaginary cylindrical feed plane area, the crystals merge into the melt. In a washing zone between the feed plane and the cylindrical wall, the liquid impurities adhering to the crystal surface are gradually displaced by the product melt in the counter-current contact with the reflux.

When approaching the heated cylindrical wall 30, the crystals melt. A major portion of their melt (80–90% of the crystal mass) is withdrawn as refined product. The remaining 20–10% is being displaced by the newly arriving crystals in the inwardly radial direction, exerting the cleansing action. As a result, the space between the heated cylindrical portion 30 of the apparatus and the feed radius contains product melt with inwardly increasing concentration of impurities. In the embodiment shown, the heat is delivered by radiant electric heaters 14 located within a shroud 13.

Product collectors 58 which are similar in design to the feed distributors 53 and orbit with them at the same rotational speed, serve for withdrawing the pure product melt from the apparatus through product conduits 57, upper hollow section of shaft 50 with attached impeller 63 and through outlet nozzle 2.

Both the feed distributors and product collectors are parts of the inner (slower) rotor assembly, extending through the vertical length of the cylindrical portion 30 of the apparatus. As they rotate at a lower speed than the drum (say by 60 rpm here), both the feed distribution and product collection take place periodically at each point on the respective radius, twice per second.

The two lower bearings (42 and 43) of the apparatus are tapered roller bearings; they take both the radial and axial loads. The upper bearings 37 and 38 are cylindrical roller bearings which allow some axial shift to accomodate thermal expansion of the construction parts.

Stationary parts 9, 10 and 11 serve for keeping the seal 12 wet by flooding the space above the annular ring 9 with liquid.

The purpose of the two backpressure valves 54 (or restriction orifices) located at the entrance from the feed conduits 52 into the feed distributors 53 is to suppress flashing and bubble formation in the feed coduits 52 under the conditions of centrifugal acceleration.

Buyoancy cavities 61 are disposed throughout the full length of the feed distributors and product collectors. They contain trapped gas (air) inside and their purpose is to provide the average density of those parts to essentially equal that of the surrounding liquid, to counter-balance the centrifugal force by buoyancy. This compensates for the centrifugal force and facilitates their structural design for operation under submerged rotational conditions.

The impeller 63 is attached to the upper end of the shaft 50 and provides the main driving force for product flow from the apparatus. It acts as a booster pump in addition to the other three forces which also enable its priming; two of them are derived from the difference in angular velocities between the rotating liquid and the product collecting system (centripetal force and impact pressure), the third one is the gas pressure in the annular space surrounding the shaft 50. It may be necessary to increase this priming force during each startup by shortly increasing the differential rotational speed of the two rotors (by slowing down the internal rotor).

The drum top consists of a pair of identical outer segments 33 and two inner segments 34 and 35, all designed with overlapping step edges so that the internal pressure in the operating apparatus assists in compressing the sealing gaskets. The closure of the drum top is completed by a centering hub 36. Segmental parts 34 and 35 may accomodate sight glasses for stroboscopic observation of the process. Part 62 is a flat disc reaching under the cylindrical liquid surface; it acts as a liquid seal taking off the load of the seal 40 which is of dry running type. Item 62 is optional, it can be sacrificed in favor of better stroboscopic observation.

OPTIONAL FEATURES

FIGS. 6 thru 9 show a full-featured apparatus incorporating provisions for additional crystal seeding and also for alternate heat delivery.

Additional crystal seeding is accomplished by extending the feed passage through the shaft 50 upwards and flash-crystallizing a small portion of CF along its progression to the vicinity of the upper portion of the cylindrical liquid surface.

The routing of the main portion of CF is through the feed entrance 7 and feed pipe 18 into the feed distributors 53 while a controlled small stream of CF is injected via needle valve (parts 18 and 19) into the recirculating seed stream delivered by the crystal seed recirculating impeller 64. The two streams combine and proceed upwards while flashing and forming additional solids. A stationary screw insert 17 with non-stick surface is integral with the top of the feed pipe 18. Its function is to inhibit buildup of solids by scraping action, as well as providing an additional upward transportation effect in the rotating stream.

Alternative heat delivery is possible by continually withdrawing an extra amount of the product from the apparatus, heating it outside of the apparatus in a heater 23 and returning to the cylindrical wall 30 via heated melt return 16, conduit 67 and distributor 68. Compared to the basic design, one of the product collectors 58 is dedicated as heated melt distributor 68 or there can be an additional pair of distributors. In either case, the upper portion of the shaft 50 must accomodate two separate channels.

This arrangement enables utilization of alternative heat sources, particularly waste heat.

Conical bottom of the outer rotor is an alternative to the dished one shown on FIG. 1.

LIST OF REFERENCE NUMERALS

Stationary parts:
- 1 product seal gland
- 2 product pump casing w. product exit
- 3 frame parts
- 4 lower end piece
- 5 seal gland
- 6 gas and reject exit nozzle
- 7 combined feed entrance port
- 8 feed seal gland
- 9 annular ring
- 10 seal flush/vent
- 11 flow glass
- 12 seal
- 13 shroud
- 14 heating elements
- 15 partition disc
- 16 heated melt return
- 17 screw insert w. non-stick surface
- 18 feed pipe w. needle valve seat
- 19 valve needle
- 20 hand wheel
- 21 packing gland
- 22 packing gland
- 23 heater Outer rotor:
- 30 drum cylinder
- 31 lower drum bottom
- 32 gas and reject overflow nozzle
- 33 outer rotor top segment—outer (2)
- 34 outer rotor top segment—inner
- 35 outer rotor top segment—inner
- 36 outer rotor top centering hub
- 37 roller bearing
- 38 roller bearing
- 39 seal gland
- 40 seal
- 41 reject and gas discharge slots
- 42 bearing
- 43 bearing
- 44 faster sheave
- 45 annular ring
- 46 annular overflow disc (therm. insulated)

Inner rotor:
- 50 inner rotor shaft
- 51 slower sheave
- 52 feed conduit (2)
- 53 feed distributor (2)
- 54 back pressure valve (2)
- 55 plug (2)
- 56 mechanical support (2 on FIG. 1, 4 on FIG. 6)
- 57 product conduit
- 58 product collector
- 59 seal
- 60 seal
- 61 buoyancy cavity (4)
- 62 liquid seal disc 63 product pump impeller
64 crystal seed recirculating impeller
65 underflow double-disc
66 crystal seed conduit (2)
67 heated melt conduit
68 heated melt distributor
69 bearing
70 recycle seed stream discharge (2)
71 seal rings
72 retaining ring
73 bearing
74 snap ring

What is claimed is:

1. An apparatus for centrifugal crystallization from a solution, comprising
    an outer drum-like rotor rotatably supported on a support frame and having a cylindrical outer wall with means for heating the liquid adjacent to said cylindrical wall,
    an inner rotor concentrically arranged within and supported so as to be rotatable relative to said outer rotor, and consisting of a shaft having inlet and outlet means and carrying
        a frame-shaped structure formed by conduits connected to said inlet means for supplying a feed solution into said rotor to a feed radius spaced from said cylindrical wall, collection conduits connected to said outlet means for collecting a refined product from an area adjacent to said cylindrical wall, and
        pumping means for concentrating crystal fines entrained by mother liquor and recycling them back to the crystallization process,
    stationary parts consisting of
        a support structure for the rotating parts,
        inlet and outlet structures for process fluids and heat delivery means for product melting,
    said outer rotor having an axial discharge nozzle for the discharge of reject liquid and vapors generated in said outer rotor.

2. An apparatus according to claim 1, wherein during operation of said apparatus said outer rotor is rotated at a higher speed than inner rotor.

3. An apparatus according to claim 1, wherein the shaft of said inner rotor carries at least one pair of feed conduit pipes and feed distribution pipes, said distribution pipes extending along the full length of the cylindrical portion of the outer rotor and having perforations opening in the direction tangential to their orbit.

4. An apparatus according to claim 3, wherein there are flow resistance means built between the feed conduits and feed distribution pipes.

5. An apparatus according to claim 1, wherein said inner rotor carries at least one pair of product conduit pipes and one pair of product collection pipes extending along the cylindrical portion of the outer rotor and having openings at their rear side with respect to their direction of movement.

6. An apparatus according to claim 1, wherein the shaft of said internal rotor carries an underflow double-disc containing a two-arm impeller for recirculating a portion of mother liquor and so transferring crystal fines as seeds to the upper portion of the cylindrical liquid surface via crystal seed conduits which are disposed between said two-arm impeller and the product conduits.

7. An apparatus according to claim 1, wherein said outer rotor consists of a cylindrical portion with one integrally connected bottom equipped with a central nozzle at one end, and one sectional access top at the opposite end.

8. An apparatus according to claim 7, wherein the access top consists of at least four sections provided with overlapping step edges and sealing gaskets disposed between sections so as to compress said sealing gaskets when exposed to the internal pressure of the operating apparatus, said outer rotor having a centering hub journaled in a bearing and connected to a drive of said outer rotor, said centering hub forming a shaft for supporting said outer rotor at one end thereof.

9. An apparatus according to claim 7, wherein said central reject and gas nozzle is journaled in a bearing connected to the support frame of said apparatus, for supporting said outer rotor at the other end, said reject and gas nozzle having longitudinal openings forming an outlet for reject liquid and gas.

10. An apparatus according to claim 1, wherein an impeller is mounted on one end of the inner rotor shaft so as to form a centrifugal pump within a cavity provided in a product seal gland.

11. An apparatus according to claim 1, wherein the shaft of the inner rotor in its lower portion accomodates
    an externally controlled valve for injecting a small portion of the pressurized feed mixture into the recirculating seeding stream so as to augment its solids content, and
    a stationary screw insert for imparting an additional transporting force to this combined stream, as well as for inhibiting deposition of solids.

12. An apparatus according to claim 1, wherein its upper portion comprises means for alternative heat delivery by recirculating a portion of the product melt as heat carrier through an external heater, said provisions consisting of a second channel for reentry of the hot melt into the apparatus through the upper portion of the inner rotor to a hot melt distributor similar to the product collector and orbiting on the same radius.

* * * * *